United States Patent [19]

Wissinger et al.

[11] 4,100,243

[45] Jul. 11, 1978

[54] PROCESS FOR THE SIZING OF COEXTRUDED, MULTIPLE-LAYER EXTRUDED PROFILES FROM THERMOPLASTIC SYNTHETIC RESINS

[75] Inventors: Waldemar Wissinger, Siegburg; Peter Gauchel, Alzenbach, both of Fed. Rep. of Germany

[73] Assignee: Dynamit Nobel Aktiengesellschaft, Fed. Rep. of Germany

[21] Appl. No.: 711,645

[22] Filed: Aug. 4, 1976

[30] Foreign Application Priority Data

Aug. 7, 1975 [DE] Fed. Rep. of Germany ....... 2535286

[51] Int. Cl.$^2$ ................................................ B29F 3/08
[52] U.S. Cl. ................................ 264/171; 264/177 R;
264/209; 264/237; 264/327; 264/348; 425/131.1
[58] Field of Search ............... 264/177 R, 171, 176 R, 264/173, 237, 209, 348, 89, 90, 327, 46.1; 425/131.1, 131.5

[56] References Cited

U.S. PATENT DOCUMENTS

| | | | |
|---|---|---|---|
| 2,375,827 | 5/1945 | Slaughter | 264/177 R |
| 3,119,148 | 1/1964 | Chambers et al. | 264/327 |
| 3,195,184 | 7/1965 | Svec | 425/378 |
| 3,274,315 | 9/1966 | Kawamura | 264/177 R |
| 3,507,939 | 4/1970 | Williams et al. | 264/327 |
| 3,811,989 | 5/1974 | Hearn | 264/177 R |
| 3,851,028 | 11/1974 | Beyer | 264/90 |
| 3,899,561 | 8/1975 | Heilmayr | 264/177 R |
| 3,927,160 | 12/1975 | Medley | 264/177 R |

*Primary Examiner*—Jeffery R. Thurlow
*Attorney, Agent, or Firm*—Craig & Antonelli

[57] ABSTRACT

A process for sizing an extruded thermoplastic structure or member formed by coextrusion of a core profile of one thermoplastic material and a cover layer of another thermoplastic material provided over a portion of the periphery of the core profile which includes the steps of sizing the extruded plastic structure in the external cross sectional dimensions, cooling during the sizing step the structure and effecting a different temperature control of the cooling of the cross section of the profile depending upon the thermoplastic material being cooled. The thermoplastic material having the higher Vicat softening temperature being more gradually cooled than the one having a lower Vicat softening temperature.

12 Claims, 4 Drawing Figures

PROCESS FOR THE SIZING OF COEXTRUDED, MULTIPLE-LAYER EXTRUDED PROFILES FROM THERMOPLASTIC SYNTHETIC RESINS

The present invention relates to a process for the sizing of extruded profiles of shaped members produced by coextrusion having a core profile or shaped portion of a thermoplastic synthetic resin, e.g. PVC, and a cover layer provided over a portion of the circumference made of a thermoplastic synthetic resin different from the thermoplastic of the core profile, such as, for example, polymethyl methacrylate polymer or a copolymer thereof, wherein the extruded, still plastic profile is sized in the external cross-sectional dimensions and is, during this step, cooled directly and/or indirectly on the outside or on the outside and inside.

It is known to size profiles or shaped members of a thermoplastic synthetic resin manufactured by extrusion by guiding the exiting, still plastic profile through a gauge or a sizing device. In this procedure, the profile is made to contact the gauge or sizing device on the inside by the application of an external vacuum and is cooled from the outside during is passage through this device. The profile solidifies and assumes on the outside extensively the shape of the sizing device. In case of hollow profiles, it is also possible to operate with an internal excess pressure in the sizing device instead of utilizing an external vacuum, whereby the profile is likewise caused to contact the wall of the sizing device. Normally, these sizing devices, especially the vacuum sizing devices, operate with indirect cooling, wherein cooling passages are provided in the walls of the sizing device through which suitable cooling media are circulated. The cooling effect of the device can be achieved, for example, by regulating the temperature of the cooling medium and the throughflow velocity. In this conventional arrangement of the sizing device, the cooling effect is identical over the respective cross section of the sizing device, since all cooling passages of the sizing device and also the individual component parts of the sizing device are uniformly cooled by means of the same cooling medium. For this makes it possible for the entire surface of the profile, as seen over the cross section, to solidify at the same time during the cooling process and for the friction forces, produced during the passage of the profile through the sizing device on the contact surfaces, to be absorbed uniformly over the entire cross section of the profile.

If profiles are being sized which are composed of multiple layers of various thermoplastic synthetic resins, different thermoplastic materials being present on the surface, as seen over the periphery, then the surface portions of the profile, as seen over the cross section, will solidify to differing extents, in correspondence with their different solidification ranges. As a consequence, the friction forces produced during the pulling through of the profile on the walls of the sizing device are absorbed primarily by the already solidified peripheral sections of the profile, thus building up unintended tensile stresses in this layer of material. Such frozen-in stresses can then later on lead to tension cracks and varying deformations of the profile under stress.

It is an object of this invention to provide a sizing device for multiple-layer extruded profiles of varying thermoplastic synthetic resins, making it possible to effect a uniform solidification and thus a uniform behavior of the various materials throughout the sizing procedure. The invention attains the thus-posed object for the multiple-layer extruded profiles by effecting a differing temperature control over the cross section of the profile.

By the utilization of the process of this invention, a different heat removal is attained on the profile surface over the same cross section, wherein the different zones are defined in correspondence with the different thermoplastic synthetic resins present on the surface of the profile. Furthermore, the provision is made that the different temperature control exerted on the profile cross section effects a solidification of the different thermoplastic synthetic resin materials on the profile surface which begins approximately at the same time. In this way, the objective is attained that multiple-layer profiles, even when being sized in a gauge or sizing device solidify on the surface at approximately the same instant over the entire cross section, and thus the produced friction forces between the sizer wall and the profile while the profile is pulled through the sizing device can be absorbed uniformly by the entire profile surface. However, this means that either no unintended tensile stresses at all are produced in the profile and/or the minor, thus-produced tensile stresses are distributed uniformly over the entire cross section. As a consequence, it is possible to produce with the use of the sizing method even a multiple-layer extruded rod-shaped profile with greatly reduced tension and high dimensional accuracy.

The invention will be explained utlizing the example of a hollow profile with a partial coating on the outside. The core profile is extruded, for example, from hard PVC, while a portion of the periphery of the profile is coated with a cover layer of a polymethyl methacrylate by means of coextrusion. This layered profile is fed directly upon exiting from the extruder in the still plastic condition to a sizing device, i.e. for example a vacuum sizing tool, which fixes the final cross-sectional dimensions of the profile under simultaneous cooling and solidification of the profile. Extrusible PVC compounds have, for example, a Vicat softening temperature ranging around 75°–80° C. This means that the plasticized PVC core profile will solidify only when reaching a temperature of below 80° C. during the cooling procedure. In contrast thereto, polymethacrylate materials have a Vicat softening temperature of 80°–115° C., the Vicat softening temperature rising with an increasing molecular weight. Assuming a polymethyl methacrylate cover layer having a Vicat softening temperature of 110° C. has been combined with the PVC core profile having a Vicat softening temperature of 80° C., then with exerting an identical temperature control on the layered profile within the sizing tool over the cross section, the polymethyl methacrylate (PMMA) layer will solidify at an earlier point in time on the surface than the remaining layer of PVC on the surface of the profile as seen over the same cross section. However, this means that considerable stresses must be absorbed on the PMMA layer and thus the uniformity properties of the coated profile become questionable, especially with the occurrence of tensions, tension cracks, bulges, etc. The process of this invention overcomes these disadvantages.

In a further development of the invention, the provision is made, for example, to cool the thermoplastic synthetic resin having the higher Vicat softening temperature more gradually on the profile surface than that having a Vicat softening temperature which is lower compared thereto. In this way, the differing solidification points are made to approach each other chronologically due to the differential cooling process, thus attaining a uniform sizing over the entire cross section. It is possible, for example, for the temperature difference between the varying temperature control levels of the surfaces of the profile cross section provided with the cover layer and the surfaces which are not covered to correspond approximately to the difference of the Vicat softening temperatures of the core material and the covering material. In an adjustment to the passage velocity of the profile through the sizing tool, the heat removal in the surface regions of the profile with the different materials present on the surface is controlled, as seen over the same cross section, so that the heat removal takes place more gradually in the regions having the higher Vicat softening temperature and so that the heat removal takes place more rapidly in the zones having the lower Vicat softening temperature, so that the solidification zones are reached at the same point in time as seen over the cross section. This differing heat removal can be attained by different types of temperature control levels, for example by obtaining the different temperature control levels, with the same initial temperature of the coolant, by the utilization of indirect cooling in one region of the profile cross section surface and by additional direct cooling in the other zone of the profile cross section surface. It is possible, for example, remaining with the indicated example, to pass the PMMA-coated surface of the profile through the part of a sizing tool maintained at a higher temperature level by a correspondingly higher temperature of the cooling medium, while the PVC profile surface contacts in the zone of the sizing tool which is cooled with a cooling medium having a lower temperature. Moreover, it is also possible to regulate the heat removal additionally by the quantity of medium flowing through per time unit. Varying temperature levels in the sizing tool in the various zones can also be attained by effecting indirect cooling in the zone with the desired higher temperature level, i.e. with the lower heat removal per unit time, whereas the cooling step is effected directly on the surface in the other zones of the sizing tool where the profile surface which exhibits the lower solidification temperature range is in contact with the tool. In this connection, air or water, or air-water mixtures can be utilized as the cooling medium, for example.

Another possibility to attain approximately a uniform chronological solidification of the various thermoplastics provides that the higher temperature control level, i.e. the more gradual cooling in the respective cross-sectional zones, is attained by the use of materials having a lower thermal conductivity for the sizing tool in these zones. In this connection, aluminum is suitable, for example, for the wall of the sizing tool where the sizing walls must be maintained at a lower temperature level, and stainless steel for the walls having the higher temperature level. The varying cooling effects, i.e. the different amounts of heat removed, can also be obtained by fashioning the walls between the cooling passages of the sizing tool and the surface of the profile to be correspondingly thicker and thinner. In this case, for example, the same cooling medium can be utilized for the entire indirect cooling in the sizing tool.

When utilizing the process of this invention, it is suggested to begin the different temperature control of varying zones of the profile surface already at the onset of the sizing step. This differing temperature control should be continued until the simultaneous solidification of the entire profile surface over the cross section has been attained. From this instant on, where practically the entire profile has solidified on the outer surface and thus exerts a uniform amount of friction on the walls of the sizing tool, a further differentiated temperature control is no longer absolutely required.

The process of this invention can be utilized for open and closed rod-shaped profiles, for hollow rod profiles and also for multi-chambered hollow rod profiles. Especially in case of hollow profiles and multichambered hollow profiles, it is possible to conduct a direct cooling process in the hollow chambers in addition to the external cooling process in the sizer, for example with the aid of water which is introduced into the hollow chambers with spray nozzles and so on.

The invention is illustrated by embodiments in the drawings and will be explained in greater detail below with reference thereto, wherein.

Figure 1:
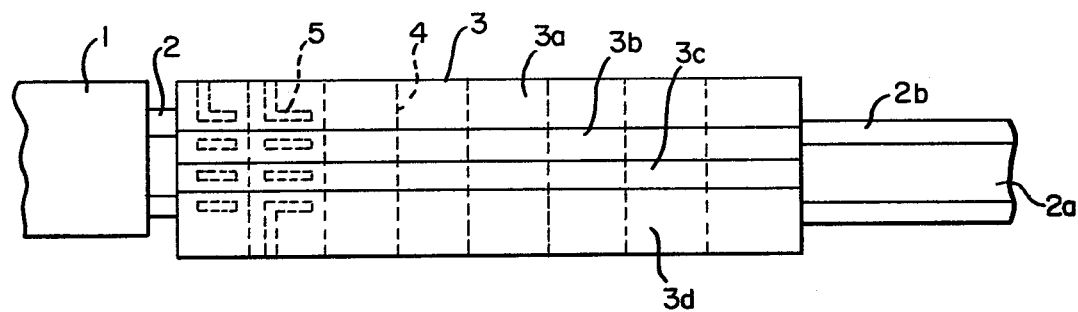
FIG. 1 shows a sizing device in a schematic lateral view.

FIG. 1 shows schematically a coextrusion unit 1 from which exits the still plastic, multiple-layer extruded profile 2. This extruded profile 2 consists of a core profile 2a made of a specific thermoplastic synthetic resin, for example hard PVC, and a cover layer 2b arranged on part of the profile surface and made from a thermoplastic synthetic resin different from the basic material, for example a polymethyl methacrylate. The multiple-layer extruded profile leaving the extruder 1 is not as yet fixed in its cross-sectional dimensions and is introduced directly subsequently into the sizing device 3 wherein it receives its final cross-sectional dimensions simultaneously during the solidification process. The sizing tool 3 can consist of several parts 3a to 3d, in correspondence with the cross sections of the profiles to be sized. The cooling and sizing step within the sizing tool takes place for examples, by way of the so-called vacuum-sizing method, wherein vacuum slots 4 are fashioned in the sizing tool in intervals over the cross section and a cooling duct system 5 for indirect cooling purposes is provided in the intermediate zones. The extruded profile 2 exits from the sizing tool in the solidified condition and with fixed dimensions. The passing velocity of the extruded profile is dependent on its dimensions as well as on the materials utilized and the sizing tool selected.

Figure 2:
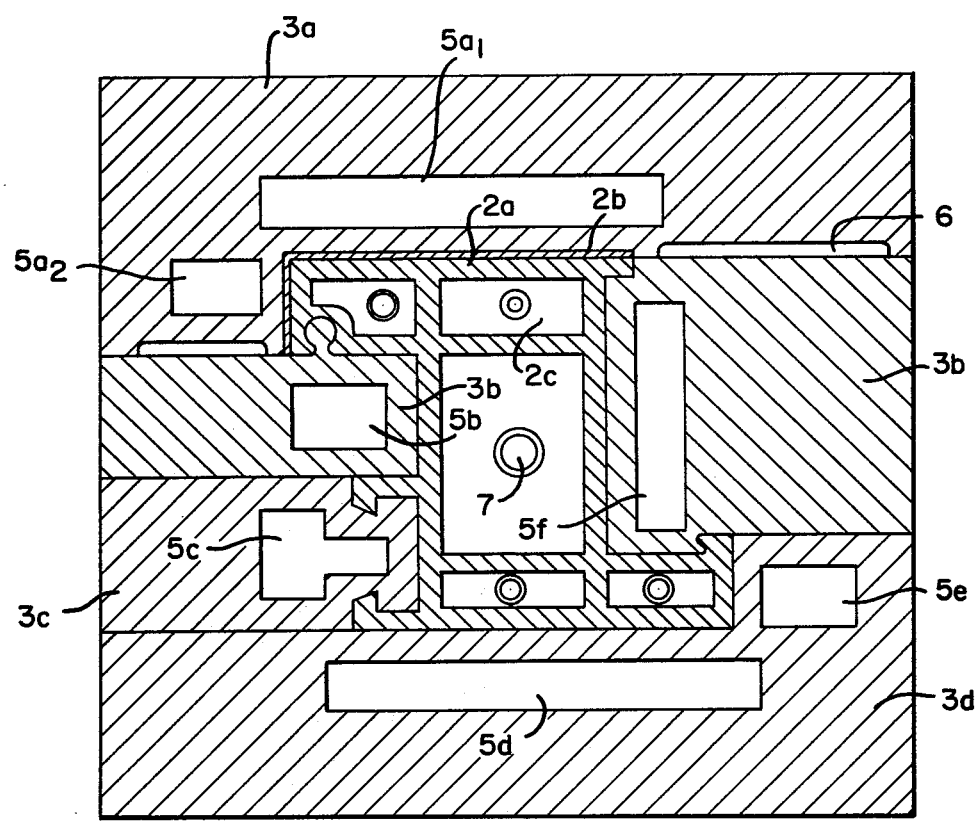
FIG. 2 shows a cross section through a multichamber vacuum sizing tool in the region of the cooling duct system for a multichamber hollow profile coated on one outer surface.

In FIG. 2, the application of the process of this invention and its conductance on a multiple-chamber coated hollow profile is illustrated schematically in a cross-sectional view. The profile 2 consists of the core profile 2a of hard PVC, which is used, for example, as a window profile and is fashioned to have multiple chambers 2c. This profile is coated on a portion of its profile surface with the cover layer 2b by means of coextrusion. This cover layer 2b is made of a material different from the basic material and is produced, for example, in the illustrated example of PMMA. The two materials selected for the profile 2 have solidification temperature ranges which deviate from each other, whereby especially the sizing of such coated, complicated cross sections of profiles is made difficult. In accordance with the invention, the provision is made that the region of the profile surface of profile 2 having the material with the higher Vicat softening temperature is cooled off more gradually than the remaining region. This means that the sizer section 3a contacting the cover layer 2b is maintained at a higher temperature level than the remaining sizer sections 3b, 3c, and 3d contacting the uncoated profile surfaces 2a. In this way, the heat removal per time unit in the sizer section 3a is more gradual than in the remaining sections, and thus the attainment of the solidification range of the PMMA is delayed until the lower solidification temperature range of the hard PVC has been reached by a more rapid cooling, i.e. a greater heat removal per unit time. It is important for the utilization of this invention that this markedly different temperature control takes place immediately at the beginning of the entrance of the plastic, multiple-layer extruded profile 2 into the sizing tool 3. The illustrated section of FIG. 2 can have been taken, for example, from such an inlet zone into the sizer. The different temperature control of the various sizer sections according to the example of FIG. 2 is accomplished by a different coolant temperature control and optionally a different amount of coolant flowing through the passages of the sizer section 3a, as contrasted to the other sections 3b, 3c, and 3d. This means that a warmer medium, e.g. cooling water, is conducted through the cooling passages $5a_1$ and $5a_2$ of the sizer section 3a than through the cooling ducts 5b, 5c, 5d, 5e, and 5f of the remaining sizer sections. To prevent a transmission of the heat from the sizer section 3a into the adjoining colder sizer sections 3b, the provision is made to arrange insulating gaps or chambers 6 in the boundary zones.

In the illustrated embodiment of a multichamber extruded profile, it is furthermore possible to cool the hollow chambers 2c in the interior directly, for example with cooling water 7 which is fed via hoses into the chambers.

Figure 3:
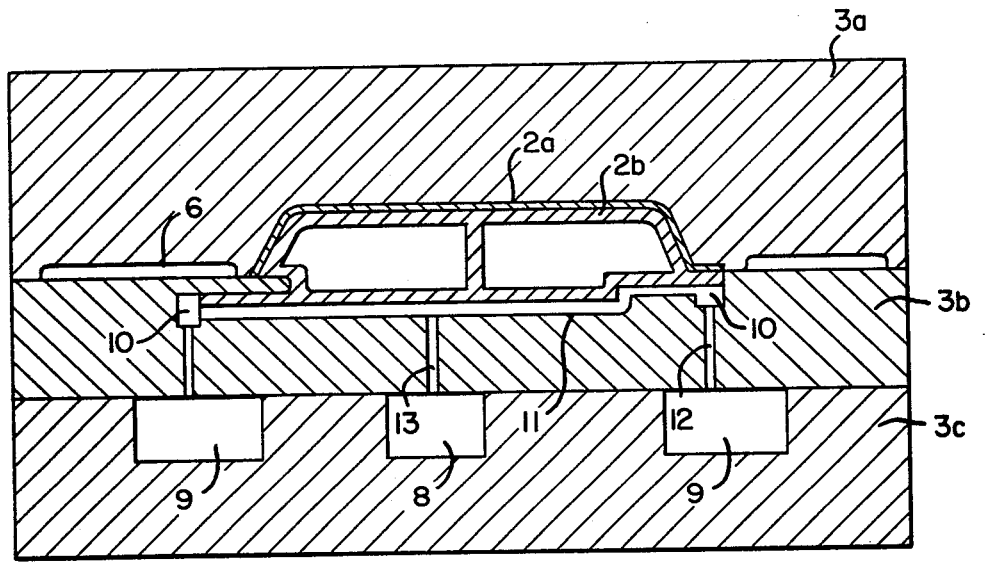
FIG. 3 shows a cross section through a sizing tool for another extruded profile having another variation of the cooling system.

In the embodiment illustrated in FIG. 3 in a schematic cross-sectional view, demonstrating the sizing of a profile coated along a portion of its outer surface, direct and indirect cooling is utilized in a combined procedure to obtain different temperature control levels, i.e. to achieve a different heat removal per unit time along the lines of this invention. The sizer section 3a contacting the cover layer 2a is cooled indirectly with a cooling medium by cooling ducts, the latter not being shown herein. The sizer sections 3b and 3c contacting the uncoated profile surface, i.e. the core profile 2b, are likewise cooled by cooling ducts, not shown, indirectly in the same manner as the sizer section 3a. To attain a different heat removal, however, the provision is made to effect additionally a direct cooling of the profile surface in the zone of the uncoated profile surface, i.e. in the zone of the sizer sections 3b and 3c, via cooling ducts 11 extending transversely to the sizer. These cooling ducts 11 are fed via the channel 8 and the conduit 13, whereas the direct coolant is removed by suction or discharged by way of longitudinally extending suction ducts 10 at the lateral ends where the transition takes place to the coated sides. These suction ducts 10 are in communication with discharge channels 9 via conduits 12. Furthermore, the provision is made again to fashion insulating gaps 6 to maintain and clearly separate the individual temperature levels between the sizer sections 3a and 3b. The sizing units with the different cooling features according to the examples shown in FIGS. 3 and 2 have the effect that the solidification of the profile surface, as seen over the cross section, begins approximately at the same point in time, wherein simultaneously the entire profile surface is being sized.

Figure 4:
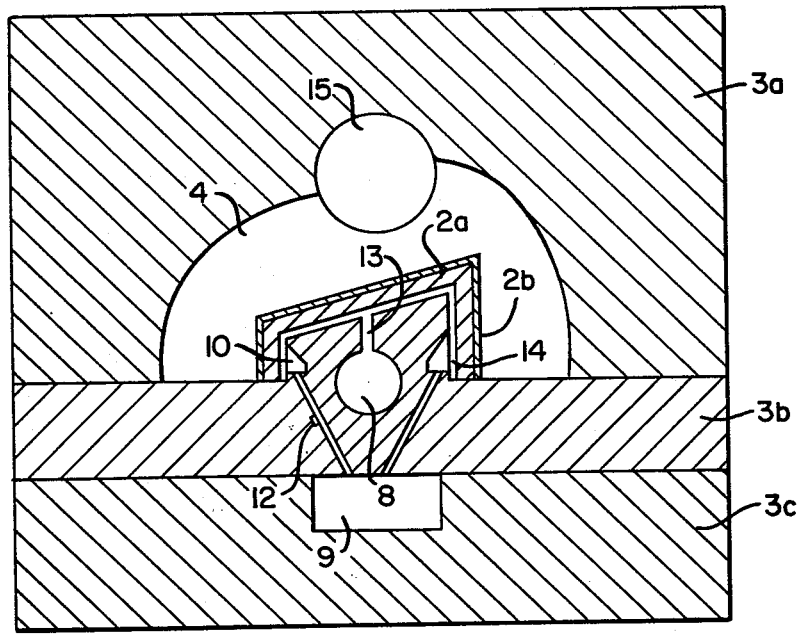
FIG. 4 shows another cross section through a vacuum sizing tool with an open extruded profile with an adapted cooling system.

The embodiment in FIG. 4 shows an open profile wherein the sizing step is conducted only over a part of the outer surface, coinciding in the illustrated embodiment with the cover layer 2b, whereas no sizing is carried out over the other portion of the profile surface where the core profile 2a lies on the surface. Even in the manufacture of these profiles the invention can be successfully utilized. For the so-called open profile 2 shown in FIG. 4, a vacuum-sizing tool 3 is likewise provided, wherein the vacuum slots 4 and the vacuum connection duct 15 are illustrated, whereas the cooling ducts serving for the indirect cooling feature are not shown. The differing heat removal in the various surface zones of the profile over the cross section to attain a simultaneous solidification of the differing materials 2a, 2b is obtained by cooling the sizer section 3a, in contact in the zone of the cover layer 2b and effecting its sizing action at that point, only indirectly by the cooling ducts (not shown) whereas a direct cooling without sizing is provided for in the remaining profile surface regions. For this purpose, cooling medium is introduced in the slot 14, namely by way of the feeding duct 8 and the conduit 13. The cooling medium is discharged by way of the lateral, longitudinally extending intake channels 10 which are connected, in turn, with the suction duct 9 via conduits 12. In this way, with the utilization of the present invention, a dimensionally stable and simultaneously low-stress profile, sized over part of its outer periphery, is produced.

What is claimed is:

1. A process for the sizing of an extruded profile manufactured by coextrusion of a core profile of a thermoplastic synthetic resin and a cover layer provided over a portion of the periphery made of a thermoplastic synthetic resin different from the thermoplastic of the core profile, such that the extruded profile has a peripheral surface that comprises in part the thermoplastic synthetic resin of the core profile and in part the thermoplastic synthetic resin of the cover layer, one of the thermoplastic synthetic resins having a higher Vicat softening temperature than the other, which comprises sizing the extruded, still plastic profile in the external cross-sectional dimensions, and cooling the extruded profile during this sizing step, said cooling being accomplished using differential cooling of different portions of the extruded profile surface, said differential cooling comprising a more gradual cooling of the part of the extruded profile surface comprised of the thermoplastic synthetic resin having the higher Vicat softening temperature than that part of the extruded profile surface comprised of the thermoplastic synthetic resin having the lower Vicat softening temperature.

2. A process according to claim 1, wherein the cooling of the surface comprised of the thermoplastic synthetic resin having the higher Vicat softening temperature is sufficiently more gradual that the cooling of the extruded profile effects an approximately uniform beginning solidification of the different thermoplastic synthetic resins on the surface of the extruded profile.

3. A process according to claim 2, wherein the extruded profile is cooled directly or indirectly or both directly and indirectly, on the outside or on the outside and inside of the extruded profile.

4. A process according to claim 2, wherein said differential cooling is accomplished by a temperature difference between the differing temperature control levels of the surface of the extruded profile comprised of the resin of the cover layer and that comprised of the resin of the core profile which temperature difference corresponds approximately to the difference of the Vicat softening temperatures of the resin forming the core profile and of the resin forming the cover layer.

5. A process according to claim 2, wherein varying temperature control levels are attained, with the same initial temperature of the cooling medium, by the use of indirect cooling in one zone of the extruded profile cross section surface and by an additional direct cooling in another zone of the profile cross section surface.

6. A process according to claim 2, wherein a higher temperature control level, providing the more gradual cooling in predetermined cross-sectional regions, is attained by the use of materials having a lower thermal conductivity for the sizing tool in these regions.

7. A process according to claim 6, wherein a lower thermal conductivity is attained by a correspondingly thicker wall between cooling ducts of the sizing tool and the profile surface.

8. A process according to claim 2, wherein the differential cooling of various regions of the profile surface begins already with the onset of the sizing step.

9. A process according to claim 2, wherein a higher temperature control level, providing the more gradual cooling in predetermined cross-sectional regions, is attained by decreasing the flow rate of the cooling medium.

10. A process according to claim 1, wherein the extruded profile peripheral surface, a portion of which is comprised of the thermoplastic synthetic resin of the cover layer, is an exterior surface.

11. A process according to claim 1, wherein the thermoplastic synthetic resin of the core profile is a polyvinyl chloride.

12. A process according to claim 11, wherein the thermoplastic synthetic resin of the cover layer is a polymethyl methacrylate polymer or copolymer thereof.

* * * * *